United States Patent [19]  [11] 4,305,991
Meyborg et al.  [45] Dec. 15, 1981

[54] INTEGRAL-SKIN POLYURETHANE FOAMS AND PROCESS THEREFOR

[75] Inventors: Holger Meyborg, Odenthal; Werner Mormann, Leverkusen; Hans-Walter Illger, Roesrath; Manfred Bock, Leverkusen, all of Fed. Rep. of Germany

[73] Assignee: Bayer Aktiengesellschaft, Leverkusen, Fed. Rep. of Germany

[21] Appl. No.: 135,817

[22] Filed: Mar. 31, 1980

[30] Foreign Application Priority Data

Apr. 7, 1979 [DE] Fed. Rep. of Germany ....... 2914134

[51] Int. Cl.$^3$ ............... C08G 18/14; C08G 18/16; C08G 18/30; B32B 5/14
[52] U.S. Cl. ............................ 428/318.8; 521/51; 521/167; 521/128; 521/129; 521/99; 521/121; 521/125; 264/DIG. 14; 428/423.3
[58] Field of Search ............... 521/51, 167; 428/315

[56] References Cited

U.S. PATENT DOCUMENTS

| 3,264,231 | 8/1966 | Ibbotson | 521/167 |
| 3,523,918 | 8/1970 | Gonzalez | 521/51 |
| 4,107,102 | 8/1978 | Dahm et al. | 521/51 |
| 4,150,206 | 4/1979 | Jourquim et al. | 521/51 |
| 4,189,542 | 2/1980 | Kleimann et al. | 521/51 |

FOREIGN PATENT DOCUMENTS

| 969114 | 9/1964 | United Kingdom. | |
| 987354 | 3/1965 | United Kingdom | 521/167 |
| 1209243 | 10/1970 | United Kingdom. | |

*Primary Examiner*—H. S. Cockeram
*Attorney, Agent, or Firm*—Gene Harsh; Joseph C. Gil; Lyndanne M. Whalen

[57] ABSTRACT

The instant invention relates to a process for the production of polyurethane foams by reacting polyisocyanates with polyhydroxyl compounds of a specified molecular weight range in the presence of blowing agents and chain lengthening or cross-linking agents and optionally in the presence of catalysts, foam stabilizers and other additives generally known. The improvement resides in (a) the polyisocyanates used containing aliphatically and/or cycloaliphatically bound isocyanate groups;
(b) the polyhydroxyl compounds used containing ether groups; and
(c) the chain lengthening or cross-linking agents comprising at least in part a member selected from the group consisting of a monoalkoxylated hydrazine, a dialkoxylated hydrazine, a reaction product of a monoalkoxylated or dialkoxylated hydrazine with an aliphatic monoisocyanate in a molar ratio of 1:1. The reaction is carried out in the presence of additional chain lengthening agents having a specified molecular weight. The present invention also relates to polyurethane foams obtained by this process.

10 Claims, No Drawings

INTEGRAL-SKIN POLYURETHANE FOAMS AND PROCESS THEREFOR

FIELD OF THE INVENTION

This invention relates to a new process for the production of polyurethane foams, in particular those polyurethane foams which have an integral skin (integral foams), which are resistant to weathering (and particularly to ageing by hot air) and to UV light.

BACKGROUND OF THE INVENTION

Polyurethane integral skin foams of the type obtained by the method of foaming in a mold (see e.g. German Auslegeschriften 1,196,864, corresponding to British Pat. No. 969,114, and 1,694,138, corresponding to French Pat. No. 1,559,325 and British Pat. No. 1,209,243) are eminently suitable for the mass production of lightweight building construction (e.g. for the furniture, vehicle and house building industries) and of elastic molded articles (such as cushions, shock absorbers and shoe soles).

The molded products of flexible, semirigid and rigid polyurethane foams currently available are generally based on the reaction of aromatic polyisocyanates with polyether or polyester polyols, optionally in combination with chain lengthening agents and cross-linking agents. These molded articles have superior mechanical properties which render them suitable for many of the applications already mentioned.

A disadvantage of all these molded products is that they turn yellow due to weathering and degradation of the surface. Those molded products which are to be exposed to relatively stringent conditions must, therefore, generally be covered with a protective layer.

The discoloration of polyurethanes under the influence of light is known and is particularly severe when aromatic polyisocyanates are used. To alleviate this problem, the manufacture of polyurethane foams, with or without an integral skin, from aliphatic polyisocyanates has been pursued. The development of a suitable catalyst combination has often been the major objective of these experiments (see e.g. German Offenlegungsschrift 2,710,901). Although these foams are substantially more stable to light than those previously known, they still undergo discoloration after prolonged exposure to UV light necessitating the addition of antioxidants and UV adsorbers to insure the stability of these foams to light.

One distinct disadvantage of foams based on aliphatic polyisocyanates is their much higher susceptability to decomposition by heat than that of conventional polyurethanes produced from aromatic polyisocyanates. This also necessitates the addition of antioxidants or stabilizers.

It is, therefore, an object of the present invention to provide a process for the production of polyurethane foams, preferably having an integral skin, which will satisfy high standards of resistance to UV light as well as being sufficiently resistant to decomposition by heat. By "high standards of resistance to UV light" is meant that the material is substantially unchanged after at least 500 hours in the Xenon test (DIN draft 53 387; Kunststoff-Handbuch Vol. VII, by Vieweg and Höchtlen, Carl Hanser Verlag Munich, 1966, page 426). By "sufficient resistance to decomposition by heat" is meant that the material will withstand a storage time of 72 hours at 110° C. without becoming unusable.

DESCRIPTION OF THE INVENTION

The instant invention broadly relates to a process for the production of polyurethane foams by reacting polyisocyanates with polyhydroxyl compounds having molecular weight of from 400 to 10,000 in the presence of blowing agents and chain lengthening or cross-linking agents and optionally in the presence of catalysts, foam stabilizers and other additives generally known. The improvement in the instant invention resides in three expedients:

(a) the polyisocyanates used contain aliphatically and/or cycloaliphatically bound isocyanate groups;

(b) the polyhydroxyl compounds used contain ether groups; and (c) the chain lengthening or cross-linking agent comprises at least in part a member selected from the group consisting of a monoalkoxylated hydrazine, a dialkoxylated hydrazine, a reaction product of a monoalkoxylated hydrazine with an aliphatic monoisocyanate in a molar ratio of 1:1, a reaction product of a dialkoxylated hydrazine with an aliphatic monoisocyanate in a molar ratio of 1:1, and mixtures thereof. The reaction may be carried out in the presence of additional chain lengthening agents having a molecular weight of from 32 to 400.

The present invention also relates to polyurethane foams obtainable by this process.

The organic polyisocyanates used in the instant process have aliphatically and/or cycloaliphatically bound isocyanate groups, i.e. they include aliphatic, cycloaliphatic or araliphatic polyisocyanates such as those described e.g. by W. Siefken in Justus Liebigs Annalen der Chemie, 562, pages 75 to 136. Specific examples are the following: ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers. Further examples are 1-isocyanato-3,3,5-trimethyl-5-isocyanatomethyl-cyclohexane (German Auslegeschrift 1,202,785), hexahydrotolylene-2,4- and -2,6-diisocyanate and any mixtures of these isomers. Additional specific examples include hexahydrophenylene-1,3- and/or -1,4-diisocyanate, perhydrodiphenylmethane-2,4'- and/or 4,4'-diisocyanate and diisocyanates and polyisocyanates which are based on the above-mentioned monomeric isocyanates and contain carbodiimide groups, allophanate groups, isocyanurate groups, urethane groups, acylated urea groups, biuret groups (U.S. Pat. No. 3,124,605), uretdione groups, ester groups, ether groups, thioether groups or thioester groups. Semi-prepolymers and prepolymers of these isocyanates and polyesters, polyethers, polyester polyethers, thioethers, thioesters and polythioether polythioesters may also be used. Any mixtures of the above-mentioned polyisocyanates are also suitable.

1-isocyanato-3,3,5-trimethyl-5-isocyanatomethyl-cyclohexane, 4,4'-dicyclohexylmethane-diisocyanate and/or tolylene diisocyanate which is hydrogenated in the nucleus and a liquid reaction product of excess quantities of 1-isocyanato-3,3,5-trimethyl-5-isocyanatomethyl-cyclohexane, 4,4'-dicyclohexylmethane-diisocyanate and/or tolylene diisocyanate which is hydrogenated in the nucleus with organic polyhydroxyl compounds are preferred.

Particularly preferred isocyanate components for the instant process are the reaction products of excess quantities of 1-isocyanato-3,3,5-trimethyl-5-isocyanatomethyl cyclohexane (isophorone diisocyanate) with organic polyhydroxyl compounds of the type exemplified below, using an NCO/OH ratio within the range of from 2:1 to 100:1, preferably from 4:1 to 16:1. These preferred "quasi-prepolymers" with isocyanate end groups generally have a viscosity, at 20° C., in the range of from 80 to 5,000 mPas, preferably from 100 to 2,500 mPas, and an isocyanate content in the range of from 10 to 35% by weight, preferably 24 to 32% by weight.

The reactants used for the polyisocyanate component in the instant process may be any organic compounds containing ether groups and at least 2 hydroxyl groups and having a molecular weight in the range of from 400 to 10,000, preferably from 1,000 to 6,000.

The polyethers used in the present invention which have at least 2, generally from 2 to 8, preferably from 2 to 4, and in particular 2 or 3 hydroxyl groups, are known. They may be prepared, for example, by the polymerization of epoxides such as ethylene oxide, propylene oxide, butylene oxide, tetrahydrofuran, styrene oxide or epichlorohydrin, either on their own (e.g. in the presence of $BF_3$) or by a chemical addition of these epoxides, optionally as mixtures or successively, to starting components which have reactive hydrogen atoms, such as alcohols or amines (e.g. water, ethylene glycol, propylene glycol-(1,3) or -(1,2), trimethylol propane, 4,4'-dihydroxy diphenyl propane, aniline, ammonia, ethanolamine or ethylene diamine). Sucrose polyethers such as those described, for example, in German Auslegeschriften 1,176,358 and 1,064,938 may also be used in the present invention. It is preferred to use polyethers which contain predominantly primary OH groups (up to 90% by weight based on all the OH groups in the polyether). Polyethers modified with vinyl polymers may also be used, e.g. those obtained by the polymerization of styrene or acrylonitrile in the presence of polyethers (U.S. Pat. Nos. 3,383,351; 3,304,273; 3,523,093 and 3,110,695 and German Pat. No. 1,152,536). Representatives of these compounds have been described, for example, in High Polymers, Volume XVI, "Polyurethanes, Chemistry and Technology" by Saunders Frisch, Interscience Publishers, New York, London, Part I, 1962, pages 32–42 and pages 44–54 and Part II, 1964, pages 5–6 and 198–199 and in Kunststoff Handbuch, Volume VII, Vieweg Höchtlen, Carl Hanser Verlag, Munich, 1966, e.g. on pages 45 to 71.

The known polyols free from ether groups, such as polyesters, polyacetals and polycarbonates, may also be included in concentrations of up to 50% by weight, based on the polyethers.

Suitable components (c), chain lengthening agents, are monoalkoxylated and/or dialkoxylated hydrazine and/or their reaction products with aliphatic or cycloaliphatic monoisocyanates (molar ratio 1:1) in a quantity of from 0.1 to 10% by weight, preferably from 1 to 5% by weight, based on the polyhydroxyl compound which has a molecular weight of from 400 to 10,000. The known alkylene oxides such as ethylene oxide, propylene oxide, butylene oxide or tetrahydrofuran are used for the mono- or dialkoxylation of hydrazine. The molar ratio of alkylene oxide to hydrazine is in the range of from 1:1 to 2:1.

The following are examples of such component (c) chain lengthening agents: mono- and diethoxylated hydrazine, mono- and dipropoxylated hydrazine and reaction products of these compounds with monoisocyanates such as methyl, ethyl, isopropyl, butyl, pentyl, hexyl, octyl and/or stearyl isocyanate (molar ratio 1:1). Reaction products of the mono- or dialkoxylated hydrazine with $C_1$–$C_{18}$ alkyl monoisocyanates are preferred.

Hydrazinoethanol is particularly preferred as a chain lengthening agent.

The known compounds having a molecular weight of from 32 to 400 which have at least 2 isocyanato-reactive hydrogen atoms may be used as additional chain lengthening agents. These include compounds containing hydroxyl and/or amino groups and/or thiol groups and/or carboxyl groups, preferably hydroxyl groups and/or amino groups, which are used as chain lengthening agents or cross-linking agents. These compounds generally have from 2 to 8, preferably from 2 to 4, isocyanate-reactive hydrogen atoms.

Mixtures of various compounds having 2 isocyanate-reactive hydrogen atoms and a molecular weight of from 32 to 400 may be used. These additional known chain lengthening agents are used in a quantity of from 0.1 to 10% by weight, preferably from 1 to 5% by weight, based on the polyhydroxyl compound having a molecular weight of 400 to 10,000.

The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethyl-cyclohexane, 2-methyl-1,3-propanediol and dibromobutenediol (U.S. Pat. No. 3,723,392). Additional examples are glycerol, trimethylol propane, hexanetriol-(1,2,6), trimethylol ethane, pentaerythritol, quinitol, mannitol, sorbitol, castor oil, diethylene glycol, triethylene glycol and tetraethylene glycol. Also suitable are higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxydiphenyl propane, dihydroxymethyl-hydroquinone, ethanolamine, diethanolamine, N-methyl-diethanolamine, triethanolamine and 3-aminopropanol.

The low molecular weight polyols suitable for the instant invention may also be mixtures of hydroxy aldehydes and hydroxy ketones ("formose") or the polyhydric alcohols ("formitol") obtained from them by reduction, for example, catalysts which can be obtained by the autocondensation of formaldehyde hydrate in the presence of metal compounds or the co-catalysts obtained by the autocondensation of compounds which are capable of enediol formation (German Offenlegungsschriften Nos. 2,639,084; 2,714,084; 2,714,104; 2,721,186; 2,738,154 and 2,738,512). In order to obtain synthetic materials having improved flame resistance, these formoses are advantageously used in combination with aminoplast formers and/or phosphites (German Offenlegungsschriften Nos. 2,738,513 and 2,738,532). Solutions of polyisocyanate polyaddition products, in particular of polyurethane ureas which contain ionic groups and/or of polyhydrazodicarbonamides in low molecular weight polyhdyric alcohols may also be used as the polyol component in the instant invention (German Offenlegungsschrift No. 2,638,759).

The following are examples of suitable aliphatic diamines for the instant invention: ethylenediamine, 1,4-tetramethylenediamine, 1,11-undecamethylenediamine, 1,12-dodecamethylenediamine and mixtures thereof. Further examples of suitable diamines are 1-amino-3,3,5-trimethyl-5-aminomethyl-cyclohexane ("isophorone diamine"), 2,4- and 2,6-hexahydrotolylene diamine and mixtures thereof. Additional examples are perhydro-2,4'- and -4,4'-diaminodiphenylmethane, P-xylylene diamine, bis-(3-aminopropyl)-methylamine, diaminoperhydroanthracenes (German Offenlegungsschrift No. 2,638,731) and cycloaliphatic triamines according to German Offenlegungsschrift No. 2,614,244. Hydrazine and alkyl substituted hydrazines, e.g. methyl hydrazine, N,N'-dimethyl hydrazine and their homologues are also suitable. Acid dihydrazides may also be used for the instant invention, e.g. carbodihydrazide, oxalic acid dihydrazide, the dihydrazides of malonic acid, succinic acid, glutaric acid, adipic acid, β-methyl adipic acid, sebacic acid, hydracrylic acid and terephthalic acid. Semicarbazido alkylene hydrazides such as β-semicarbazido propionic acid hydrazide (German Offenlegungsschrift No. 1,770,591), semicarbazide alkylene carbazic esters such as 2-semicarbazidoethyl carbazic ester (German Offenlegungsschrift No. 1,918,504) or amino-semicarbazide compounds such as β-aminoethylsemicarbazido carbonate (German Offenlegungsschrift No. 1,902,931) are also examples of suitable compounds. The amino groups may be partly or completely blocked by aldimine or ketimine groups to control their reactivity (U.S. Pat. No. 3,734,894, German Offenlegungsschrift No. 2,637,115).

The following compounds may also be used as additional chain lengthening agents: 1-mercapto-3-aminopropane, substituted or unsubstituted amino acids such as glycine, alanine, valine, serine and lysine and substituted or unsubstituted dicarboxylic acids such as succinic acid, adipic acid, phthalic acid and 4-hydroxyphthalic acid.

Compounds which are monofunctional in their reaction with isocyanates may also be used as so-called chain breakers in a proportion of from 0.01 to 10% by weight, based on the polyurethane solid content. Examples of such monofunctional compounds include monoamines such as butylamine and dibutylamine, octylamine, stearylamine, N-methyl-stearylamine, pyrrolidine, piperidine and cyclohexylamine. Also suitable are monohydric alcohols, for example butanol, 2-ethyl-hexanol, octanol and dodecanol and various amyl alcohols, cyclohexanol and ethylene glycol monoethyl ethers.

Readily volatile organic substances are used as blowing agents in the instant invention. Examples of suitable organic blowing agents include acetone, ethylacetate, halogen substituted alkanes, such as methylene chloride, ethylidene chloride, monofluorotrichloromethane, chlorodifluoromethane, dichlorodifluoromethane, trichlorotrifluoroethane, butane, hexane, heptane and diethyl ether. The effect of a blowing agent may also be obtained by the addition of compounds which decompose at temperatures above room temperature to release gases, e.g. nitrogen. Examples of such compounds include azo compounds such as azoisobutyric acid nitrile. Other examples of blowing agents and details concerning the use of blowing agents may be found in Kunststoff Handbuch, Volume VII, published by Vieweg and Höchtlen, Carl Hanser Verlag, Munich, 1966, e.g. on pages 108 and 109, 453 to 455 and 507 to 510.

Water may also be added as a chemical blowing agent.

The process of the instant invention is preferably carried out in the presence of any organic compounds containing amidine groups or imidazole groups, optionally in the presence of any known organic metal catalysts which accelerate the isocyanate addition reaction. Both the catalysts used in the instant process are preferably added to the polyol component in a quantity of from 0.1 to 5% by weight, preferably from 0.5 to 2.5% by weight, based on the polyol component.

Preferred amidine catalysts include compounds corresponding to the general formula (I):

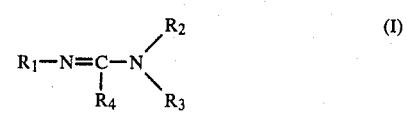

wherein $R_1$, $R_2$ and $R_3$, which may be identical or different, represent hydrogen, an aliphatic hydrocarbon group having from 1 to 18, preferably from 1 to 4 carbon atoms, an aromatic hydrocarbon group having from 6 to 10 carbon atoms, preferably a phenyl group, an araliphatic hydrocarbon group having from 7 to 10 carbon atoms, preferably a benzyl group, or a cycloaliphatic hydrocarbon group having from 5 to 7 carbon atoms, preferably a cyclohexyl group, and $R_4$ represents a group of the type defined for $R_1$ or the group $N(R_2)(R_3)$.

The following are examples of such amidines: N,N'-dimethyl formamidine, N,N'-dimethyl acetamidine, trimethyl acetamidine, N,N'-dimethyl formamidine, N-benzyl-N,N'-dimethyl acetamidine, N,N'-dimethyl-N-ethyl benzamidine, N,N'-dicyclohexyl-N-methylacetamidine, triphenyl benzamidine, N,N'-diphenyl-N'-methyl benzylamidine, tetramethyl guanidine, N,N'-diphenyl-N,N'-dimethyl guanidine and tetra phenyl guanidine.

The preparation of such amidines has been comprehensively described with general methods of preparation and special examples of Houben Müller Weyl, Methoden der Organischen Chemie, Volume XI, 2, pages 38 to 66, published by G. Thieme, Stuttgart, 1958.

Additional preferred amidine catalysts correspond to the general formula (II):

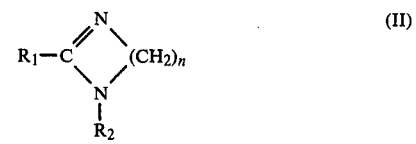

wherein $R_1$ and $R_2$ are defined as above, and n represents an integer of from 2 to 4.

The following are examples of such monocyclic amidines: 2,3-dimethyl-3,4,5,6-tetrahydropyrimidine, N-methyl-Δ2-tetrahydropyrimidine, N-cyclohexyl-2-methyl-Δ2-tetrahydropyrimidine, N-benzyl-2-butyl-Δ2-tetrahydropyrimidine, 2-methyl-Δ2-imidazoline, 1,2-diphenyl-2-imidazoline, 1-methyl-Δ4-1,2,4-triazoline and 1,5-dibutyl-Δ4-1,2,4-triazoline.

The preparation of these cyclic amidines has also been described in Houben Müller Weyl, Methoden der Organischen Chemie, Volume XI, 2, pages 38 to 66.

Further preferred amidine catalysts correspond to the general formula (IV):

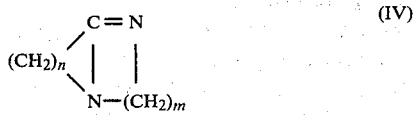

wherein n and m, which may be identical or different, represent integers of from 2 to 4.

Examples of such bicyclic amidines include 1,5-diazabicyclo-(4,3,0)-nonene-5, 1,5-diazabicyclo-(4,4,0)-decene-5 and 1,8-diazabicyclo-(5,3,0)-undecene-7. The preparation of such bicyclic compounds has been described, for example, in German Offenlegungsschrift 1,545,855.

The amidines may be partly or completely replaced by catalysts containing imidazole groups. Imidazoles which are particularly suitable for this purpose include compounds corresponding to the general formula (V):

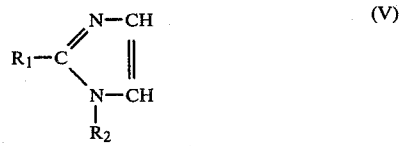

wherein R₁ and R₂ are defined as above.

Examples of such imidazoles include N-methyl imidazole, N-butyl imidazole and 2,3-dimethyl imidazole. The preparation of such imidazole derivatives has been described, for example, by V. Anwers and Mauss, Ber.dtsch.Chem.Ges. 61, 2315-2418 (1928).

If desired, organic metal catalysts may be used in addition to the amidine imidazole catalysts. Suitable organic metal catalysts are preferably organic tin compounds, particularly carboxylates of divalent or tetravalent tin, and of these, the dialkyl tin dicarboxylates are preferred. Among the suitable compounds of divalent tin, tin(II)-carboxylates based on aliphatic monocarboxylic acids having 2-18, preferably 8-12, carbon atoms are preferred. Examples of these include tin(II)-acetate, tin(II)-octoate, tin(II)-ethyl hexoate and tin(II)-laurate. Among the preferred compounds of tetravalent tin are dialkyl tin(IV)-dicarboxylates such as dibutyl tin diacetate, dibutyl tin dilaurate, dibutyl tin maleate and dioctyl tin diacetate.

The amidine and imidazole catalysts exemplified above may be used either in the pure form or as metal complexes of tin salts, as described in German Offenlegungsschrift No. 2,434,185.

Other catalysts may, of course, be used in addition to those catalyst combinations which are essential to the present invention. These additional catalysts belong to the state of the art of polyurethane chemistry and have been described, for example, in Kunststoff Handbuch, Volume VII, published by Vieweg Höchtlen, Carl Hanser Verlag, Munich, 1966, e.g. on pages 96 to 102.

Surface active additives (emulsifiers and foam stabilizers) may also be used in the instant invention. Suitable emulsifiers include e.g. the sodium salts of ricinoleic sulfonates or of fatty acids or salts of fatty acids with amines, such as oleic acid diethylamine of stearic acid diethanolamine. Alkali metal or ammonium salts of sulfonic acids, such as dodecyl benzene sulfonic acid or dinaphthyl methane disulfonic acid, or of fatty acids such as ricinoleic acid or of polymeric fatty acids may also be used as surface active additives.

Suitable foam stabilizers are mainly water soluble polyether siloxanes. These compounds generally have a polydimethyl siloxane group attached to a copolymer of ethylene oxide and propylene oxide. Foam stabilizers of this type have been described, e.g. in U.S. Pat. No. 2,764,565.

Reaction retarders, e.g. compounds which are acid in reaction such as hydrochloric acid, sulfuric acid, phosphoric or organic acid halides may also be used with the instant invention. Known cell regulators such as paraffins or fatty alcohols or dimethyl polysiloxanes; pigments, dyes and known flame retarders, e.g. tris-chloroethyl phosphate and ammonium phosphate or polyphosphate are also usable with the instant invention. In addition, stabilizers against the effects of ageing and weather; plasticizers; fungistatic and bacteriostatic substances and fillers such as barium sulfate, kieselguhr, carbon black or whiting may also be used.

Other examples of surface active additives, foam stabilizers, cell regulators, reaction retarders, stabilizers, flame retarding substances, plasticizers, dyes, fillers and fungistatic and bacteriostatic substances which may be used with the instant invention and details concerning their use and mode of action have been described in Kunststoff Handbuch, Volume VII, published by Vieweg and Höchtlen, Carl Hanser Verlag, Munich, 1966, e.g. on pages 103 to 113.

To carry out the process of the instant invention, the starting materials are reacted by the known one-step process, prepolymer process or so-called semi-prepolymer process, in many cases using mechanical devices such as those described in U.S. Pat. No. 2,764,565. Details concerning processing apparatus which may be used are given in Kunststoff Handbuch, Volume VII, published by Vieweg and Höchtlen, Carl Hanser Verlag, Munich, 1966, e.g. on pages 121 to 205.

The reactants are preferably used in a quantity corresponding to an isocyanate index of 90-120, preferably 100-110. An isocyanate index outside this range, particularly above 120 may, however, be used, for example when trimerization catalysts such as alkali metal acetates are used at the same time in order to trimerize the excess isocyanate groups with formation of isocyanurate. This last mentioned embodiment of the instant process, however, is less preferred. By "isocyanate index" is meant, in this context, the proportion of isocyanate groups to all the isocyanate-reactive groups present in the reaction mixture. An isocyanate index of 100 means the presence of equivalent quantities of isocyanate groups and isocyanate-reactive groups.

Production of the foams is preferably carried out by foaming in closed molds. In this method, the reaction mixture is introduced into a mold which may be made of metal, e.g. aluminum, or a nonmetal material, e.g. an epoxide resin. The reaction mixture foams up inside the mold to form the molded article. This foaming may be carried out in such a manner that the molded article has a cellular structure on its surface. It may, alternatively, be carried out to produce a molded article having a noncellular skin and a cellular core. The desired result may be obtained by, in the first case, introducing just sufficient reaction mixture into the mold to fill the mold with foam or, in the second case, introducing a larger quantity of reaction mixture than is necessary to fill the interior of the mold with foam. The second method is known as "over-charging", a procedure which has been disclosed, e.g. in U.S. Pat. Nos. 3,178,490 and 3,182,104.

So-called "external mold release agents" such as silicone oils are frequently used for foaming in molds. It is also possible, however, to use so-called "internal mold release agents", optionally in combination with external mold release agents, as disclosed, for example, in German Offenlegungsschriften Nos. 2,121,670 and 2,307,589.

The instant process may be used to produce rigid products for the manufacture of furniture parts, car body parts, technical instruments and structural elements. It may also be used to produce semirigid to flexible products for the manufacture of safety padding in the construction of motor vehicles, elastic shoe soles, shock absorbers, etc.

The following Examples serve to illustrate the process of the instant invention without restricting it in any way. In the Examples, all quantities quoted represent parts by weight or percent by weight unless otherwise indicated.

EXAMPLES

Example 1

The polyol mixture consists of 65 parts by weight of a polyether having an OH number of 900 obtained by the chemical addition of propylene oxide to trimethylol propane, 70 parts of a trifunctional polyethylene oxide-polypropylene oxide-polyether polyol having an OH number of 28 started on trimethylol propane, 1.4 parts by weight of hydrazinoethanol, 3 parts by weight of a polysiloxane-polyalkylene oxide block copolymer as a foam stabilizer, 0.6 part by weight of diazabicycloundecane, 0.4 part by weight of dibutyl tin(IV)-dilaurate and 10 parts by weight of monofluorotrichloromethane as a blowing agent.

The polyisocyanate is obtained by the prepolymerization of trimethylol propane with isophorone diisocyanate and has an isocyanate content of 29.4%. The above polyol mixture was worked up to 130 parts of the polyisocyanate under the conventional conditions of foaming in a mold to produce a rigid foam having an integral structure and a unit weight of 0.525 g/cm$^3$. The starting time was 20 seconds, the gel time 28 seconds and the mold release time 5 minutes. The dimensional stability of the material in heat according to DIN 53 432 was 95° C. The molded product was weathered for 500 hours in the weatherometer test (compare Kunststoff-Handbuch, Vol VII, by Vieweg and Höchtlen, Carl Hanser Verlag Munich, 1966, pages 426, 427) and its colour was unchanged at the end of this time.

Example 2 (Comparison)

A molded product was produced by a method analogous to that of Example 1 but without the addition of hydrazinoethanol. It was also weathered in the weatherometer test for 500 hours. At the end of this time, the material showed faint but distinctly visible signs of yellowing in the weathered areas.

Example 3

The polyol mixture consists of 168 g of a trifunctional polyethylene oxide-polypropylene oxide-polyether polyol having an OH number of 28 started on trimethylol propane, 25.2 g of butane-1,4-diol, 4.2 g of trimethylol propane, 2.2 g of a conventional polysiloxane-polyalkylene oxide foam stabilizer, 0.7 g of diazabicycloundecane, 0.4 g of dibutyl tin(IV)-dilaurate and 10 g of monofluorotrichloromethane as a blowing agent.

The polyisocyanate used was that described in Example 1.

Numerous substantially identical integral foams were produced on this basis. They differed from each other only in their proportion of hydrazinoethanol. All the foams were subsequently tempered at 110° C. for 72 hours, for example

| | Polyol Mixture* Parts by Weight | Polyisocyanate Parts by Weight | Hydrazino-ethanol Parts by Weight | Unit Weight (g/cm$^3$) | Shore A |
|---|---|---|---|---|---|
| 1 | 200 | 105 | 0 | 0.650 | 75 |
| 2 | 200 | 105.6 | 0.19 | 0.645 | 75 |
| 3 | 200 | 108.5 | 0.95 | 0.660 | 80 |
| 4 | 200 | 112 | 1.9 | 0.650 | 78 |
| 5 | 200 | 119 | 3.8 | 0.580 | 79 |

*not taking into account the blowing agent.

After tempering:

| | Shore A | ΔShore A | Remarks |
|---|---|---|---|
| 1 | — | — | Material begins to melt after only 32 hours, surface layer completely destroyed. |
| 2 | — | — | Material begins to melt after 56 hours, surface layer partly destroyed. |
| 3 | 70 | 10 | Slight yellowing, surface layer intact. |
| 4 | 70 | 8 | Barely visible yellowing. |
| 5 | 75 | 4 | Material virtually unchanged. |

Example 4 (Comparison)

The polyol mixture consists of 100 parts by weight of the polyether also used in the previous Examples, 10.5 parts by weight of ethylene glycol, 2.5 parts by weight of trimethylol propane, 1.3 parts by weight of a stabilizer, 0.4 part by weight of diazobicycloundecene, 0.56 part by weight of dibutyl tin(IV)-dilaurate and 6 parts by weight of monofluorotrichloromethane.

The polyisocyanate used is the same as that described in Example 1. The two components were used to produce an integral molded foam in the conventional manner (unit weight=0.560 g/cm$^3$).

Samples of the foam were tested for their resistance to thermo oxidation and to UV light. It was found that the material was completely destroyed after only 32 hours storage at 110° C. and began to melt after 100 hours in the Xenon test.

Example 5

An integral foam (unit weight=0.640 g/cm$^3$) containing 0.6% by weight of hydrazinoethanol was produced by a method analogous to that of Example 4. The material could be stored for 72 hours at 110° C. in the same way as described in Example 3 without undergoing undue change, thus having excellent resistance to thermo oxidation. It also survived 500 hours in the weatherometer test unchanged.

Example 6 (Comparison)

100 parts by weight of a trifunctional polyether polyol having an OH number of 45, 7 parts by weight of trimethylol propane and 3 parts by weight of water were worked up with isophorone diisocyanate in the presence of 0.2 part by weight of dimethyl tetrahydropyrimidine and 0.2 part by weight of tin(II)-dioctoate as an activator and 1 part by weight of a commercial silicon-containing flexible foam stabilizer to produce a flexible foam (NCO/OH=1.05). The foam became very brittle after 24 hours at 130° C. and was partly discolored. Another sample of this foam was subjected to a Xenon test. After 100 hours, the sample which had been exposed to UV light also showed signs of severe brittleness on the surface.

Example 7

A foam was prepared as described in Example 6, but in addition it contained 2 parts by weight of hydrazinoethanol. After 24 hours at 130° C., it showed no surface brittleness and no discoloration. No surface change could be detected after 100 hours and even after 125 hours in the Xenon test.

Example 8

A foam was prepared as described in Example 6 but in addition it contained 2 parts by weight of a reaction product of hydrazinoethanol and isopropyl isocyanate (molar ratio 1:1). The foam was subjected to the thermo oxidation test and Xenon test already indicated. It was less stable than the foam which had been stabilized with hydrazinoethanol but substantially better than the unstabilized foam.

What is claimed is:

1. A process for the production of integral skin polyurethane foams in closed molds, comprising reacting
   (a) polyisocyanates;
   (b) hydroxyl compounds having a molecular weight of from 400 to 10,000;
   (c) chain lengthening agents; and
   (d) blowing agents;
   the improvement wherein
   (i) said polyisocyanate contains aliphatically and/or cycloaliphatically bound isocyanate groups;
   (ii) said polyhydroxyl compounds contain ether groups; and
   (iii) said component (c) comprises a compound selected from the group consisting of monoalkoxylated hydrazine, dialkoxylated hydrazine, reaction products of mono- and/or dialkoxylated hydrazine with aliphatic monoisocyanates in a molar ratio of 1:1, and mixtures thereof.

2. A process as claimed in claim 1, wherein component (c), in part, is composed of known chain lengthening agents having a molecular weight of from 32 to 400.

3. A process as claimed in claim 1, wherein component (c) is hydrazinoethanol.

4. A process as claimed in claim 1, wherein component (c) is a reaction product of a $C_1-C_8$ alkyl monoisocyanate and hydrazinoethanol in said molar ratio of 1:1.

5. A process as claimed in claim 1, wherein component (c) is a reaction product of ethyl, isopropyl and/or n-butylisocyanate and hydrozinoethanol in said molar ratio of 1:1.

6. A process as claimed in claims 1 or 2 or 3 or 4, wherein said component (c) is used in a quantity of from 0.1 to 10% by weight, based on said polyhydroxyl compounds.

7. A process as claimed in claim 1, wherein said components (a) are 1-isocyanato-3,3,5,5-triethyl-5-isocyanatomethyl cyclohexane; 4,4'-dicyclohexyl methane diisocyanate and/or a tolylene diisocyanate hydrogenated in the nucleus.

8. A process as claimed in claims 1 or 7, wherein said component (a) is a liquid reaction product of organic polyhydroxyl compounds containing excess quantities of 1-isocyanato-3,3,5,5-trimethyl-5-isocyanatomethyl-cyclohexane; 4,4'-dicyclohexyl methane diisocyanate and/or a tolylene diisocyanate hydrogenated in the nucleus.

9. A process as claimed in claim 1, wherein said reaction is carried out in the presence of organic compounds containing amidine groups or imidazole groups as catalysts.

10. A polyurethane foam produced by the process of claim 1.

* * * * *